US009376935B2

(12) United States Patent
Eleftheriou et al.

(10) Patent No.: US 9,376,935 B2
(45) Date of Patent: Jun. 28, 2016

(54) GAS TURBINE ENGINE MOUNTING RING

(71) Applicant: PRATT & WHITNEY CANADA CORP., Longueuil (CA)

(72) Inventors: Andreas Eleftheriou, Woodbridge (CA); Denis Leclair, Saint Nicephore (CA); David Denis, Burlington (CA); David Menheere, Georgetown (CA); Paul Aitchison, Hamilton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 823 days.

(21) Appl. No.: 13/717,898

(22) Filed: Dec. 18, 2012

(65) Prior Publication Data
US 2014/0165533 A1 Jun. 19, 2014

(51) Int. Cl.
*F01D 25/24* (2006.01)
*F01D 25/16* (2006.01)
*F02K 3/06* (2006.01)

(52) U.S. Cl.
CPC .............. *F01D 25/162* (2013.01); *F02K 3/06* (2013.01); *F05D 2230/60* (2013.01); *Y02T 50/671* (2013.01); *Y10T 29/4932* (2015.01)

(58) Field of Classification Search
CPC ....... F01D 25/162; F01D 25/24; F01D 25/26; F02K 3/06
See application file for complete search history.

(56) References Cited

U.S. PATENT DOCUMENTS

| | | | | |
|---|---|---|---|---|
| 3,708,242 A | * | 1/1973 | Bruneau | F01D 9/044 415/200 |
| 3,830,058 A | * | 8/1974 | Ainsworth | F02C 7/20 244/54 |
| 7,543,442 B2 | | 6/2009 | Derenes et al. | |
| 7,594,404 B2 | | 9/2009 | Somanath et al. | |
| 7,766,610 B2 | | 8/2010 | Busekros et al. | |
| 7,797,922 B2 | | 9/2010 | Eleftheriou et al. | |
| 7,806,364 B1 | | 10/2010 | Udall | |
| 2012/0121395 A1 | | 5/2012 | Marke et al. | |

FOREIGN PATENT DOCUMENTS

GB 926947 5/1963

* cited by examiner

*Primary Examiner* — Craig Kim
*Assistant Examiner* — Jason Fountain
(74) *Attorney, Agent, or Firm* — Norton Rose Fulbright Canada LLP

(57) ABSTRACT

A casing for an aircraft engine includes an outer ring and an inner hub defining an airflow passage therebetween, the outer ring having an axis defining an axial direction; a plurality of struts arranged in a circumferential array and extending radially from the inner hub to the outer ring to mount the inner hub to the outer ring; wherein the outer ring is defined by a double skin including an axially-extending annular outer skin of sheet metal concentrically surrounding and radially-spaced from an annular inner skin of sheet metal, the outer and inner skins generally parallel to one another, an annular front end ring and an annular rear end ring welded or brazed to the outer and inner skins adjacent respective front and rear edges of the skins to define an annular cavity between them, and the outer ring further comprising a plurality of circumferentially spaced axially-extending ribs interconnecting the outer and inner skins to reinforce the double skins.

20 Claims, 5 Drawing Sheets

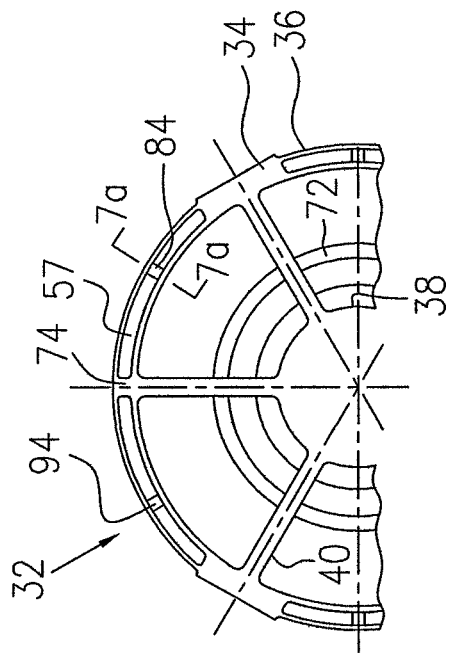
FIG. 2a
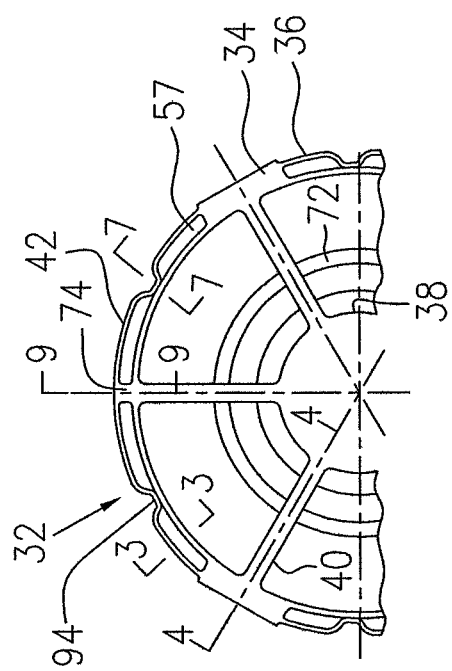
FIG. 2
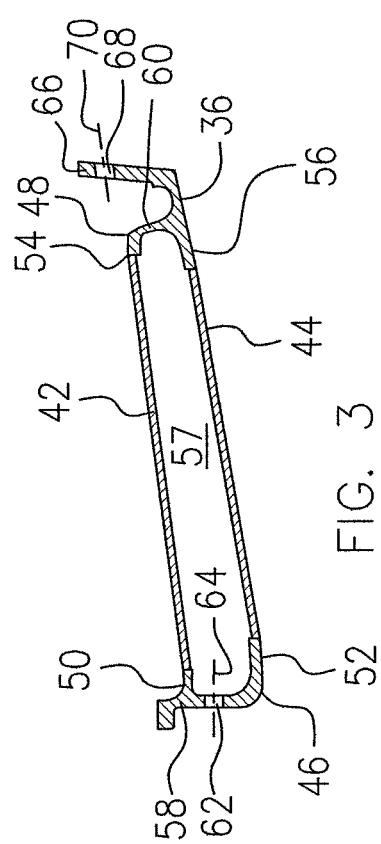
FIG. 3a
FIG. 3

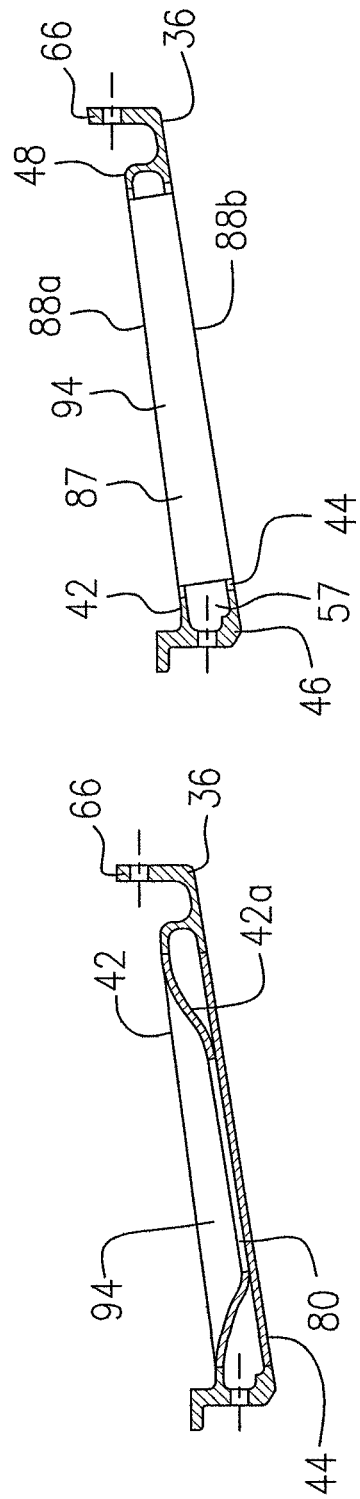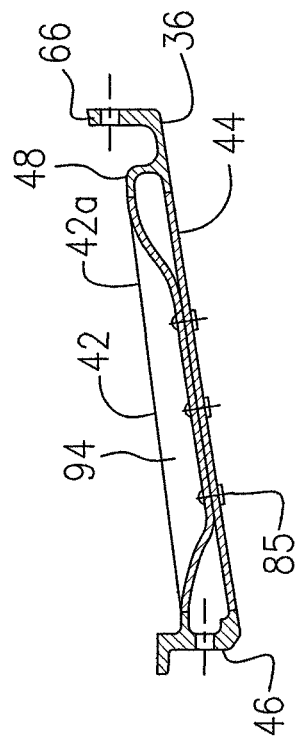
FIG. 7
FIG. 7a
FIG. 7b

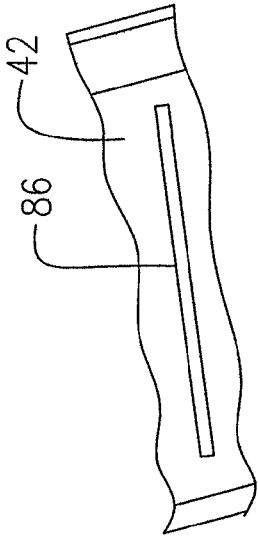
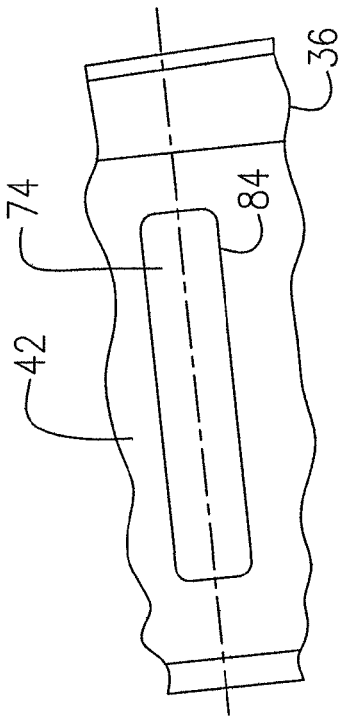
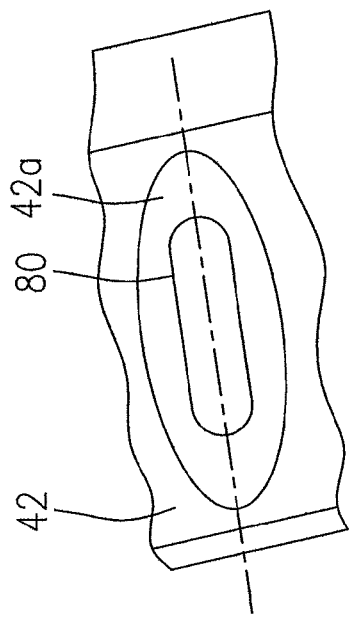
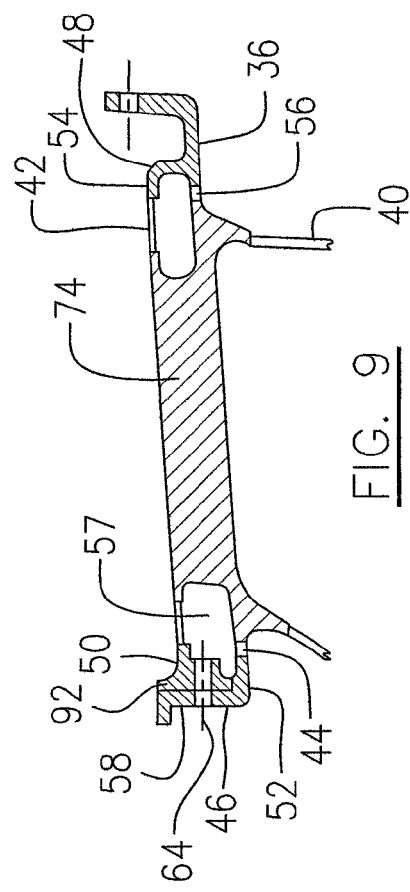

GAS TURBINE ENGINE MOUNTING RING

TECHNICAL FIELD

The application relates generally to gas turbine engines, and more particularly, to a case for such engines.

BACKGROUND OF THE ART

Turbofan gas turbine engines typically have a segmented case assembly, mainly for weight reduction reasons, but also to facilitate fabrication and assembly. A conventional case assembly may include a fan case, an intermediate case, a gas generator case, a turbine case and a turbine exhaust case in serial arrangement about a center line of the engine. The gas generator case, turbine case and turbine exhaust case surround the hot section of the engine and are typically made of steel or nickel alloys, which have good thermal resistance properties. Steel is also conventionally used for the fan case because its strength is desirable for containing blade-off events. The intermediate case and the low compressor case which are part of cooler portions of the engine, conventionally employ lighter materials such as magnesium and aluminium. The outer ring of the intermediate case is usually provided with mount members to function as a mounting ring for connection with an aircraft to which the engine is mounted. Therefore, the structure of the intermediate case and thus the mounting ring, bear loads during engine operation and it is always a challenge to manufacture a low cost fabricated mounting ring for the intermediate case.

Accordingly, there is a need for an improved structure of a gas turbine engine mounting ring and a method of manufacturing such a mounting ring.

SUMMARY

In one aspect, a casing for an aircraft engine, comprising: an outer ring and an inner hub defining an airflow passage therebetween, the outer ring having an axis defining an axial direction; a plurality of struts arranged in a circumferential array and extending radially from the inner hub to the outer ring to mount the inner hub to the outer ring; wherein the outer ring is defined by a double skin including an axially-extending annular outer skin of sheet metal concentrically surrounding and radially-spaced from an annular inner skin of sheet metal, the outer and inner skins generally parallel to one another, an annular front end ring and an annular rear end ring welded or brazed to the outer and inner skins adjacent respective front and rear edges of the skins to define an annular cavity between them, and the outer ring further comprising a plurality of circumferentially spaced axially-extending ribs interconnecting the outer and inner skins to reinforce the double skins.

In another aspect, an aircraft turbofan bypass engine having an intermediate casing disposed between a fan casing and a co-axially-disposed by-pass duct case and a compressor case, the intermediate casing comprising: an outer ring and an inner hub defining an airflow passage therebetween; a plurality of load bearing hollow struts arranged in a circumferential array and extending at least from the inner hub, radially to the outer ring, thereby mounting the inner hub to the outer ring; and wherein the outer ring is formed as a toroid having an outer skin of sheet metal and an inner skin of sheet metal, a front end and a rear end of the toroid-shaped outer ring being closed by respective front and rear end components having a radial wall, the radial wall of the respective front and rear end components being thicker than each of the inner and outer skins, each of the hollow struts including a radial outer end formed with an end boss for mounting the outer end of the hollow strut to the outer ring, the end boss interconnecting the outer and inner skins, a plurality of circumferentially spaced axial ribs interconnecting the outer and inner skins to reinforce the toroid-shaped outer ring, and the front and rear end components forming flanges with mounting holes for receiving fasteners to connect the fan casing and the by-pass duct case, respectively.

In a further aspect, there is provided a method of making a mounting ring of a gas turbine engine, the mounting ring having at least one mounting boss to mount the engine to an aircraft when the mounting ring is installed in the engine, the method comprising: providing an outer ring formed substantially in a double skin configuration having an outer skin of sheet metal surrounding and radially spaced apart from an inner skin of sheet metal; interconnecting a respective front edge of the outer and inner skins with an annular front end ring; interconnecting a respective rear edge of the outer and inner skins with an annular rear end ring; using said at least one mounting boss and a plurality of end bosses of respective load bearing struts to interconnect the outer and inner skins, the load bearing struts being hollow, disposed in a circumferential array and extending radially to mount the outer ring to an inner ring disposed within the outer ring; said at least one mounting boss being formed at an outer radial end of one of the load bearing struts; and interconnecting the outer and inner skins by radially positioning a plurality of circumferentially spaced axial ribs between the outer and inner skins to reinforce the double skin configuration of the outer ring.

DESCRIPTION OF THE DRAWINGS

Reference is now made to the accompanying figures in which:

FIG. 2 is a partial cross-sectional view of the intermediate case of the gas turbine engine shown in FIG. 1, taken along line 2-2, showing a plurality of load bearing struts extending radially to connect an outer ring to an inner ring of the intermediate case;

FIG. 2a is a partial cross-sectional view of the intermediate case of the engine according to another embodiment showing a similar configuration;

FIG. 3 is a cross-sectional view of the outer ring of the intermediate case of FIG. 2, taken along line 3-3, showing a box structure of the outer ring;

FIG. 3a is a cross-sectional view of the outer ring of the intermediate case, similar to FIG. 3, showing the rear end integrated with a flange according to an alternative configuration;

FIG. 7 is a cross-sectional view of the outer ring of the intermediate case of FIG. 2, taken along line 7-7, showing one of a plurality of axial ribs interconnecting the outer and inner skins of the outer ring according to one embodiment;

FIG. 7a is a cross-sectional view of the outer ring of the intermediate case of FIG. 2a, showing one of a plurality of axial ribs interconnecting the outer and inner skins of the outer ring according to another embodiment;

FIG. 7b is a cross-sectional view of the outer ring, similar to FIG. 7, showing one of a plurality of axial ribs according to another embodiment;

FIG. 8 is a partial top plan view of the outer ring of the intermediate case of FIG. 7, showing welds applied around an opening in the outer skin to connect the outer skin to the inner skin;

FIG. 8a is a partial top plan view of the outer ring of FIG. 7a, showing welds applied along a slot defined at respective outer and inner skins for connecting one of the plurality of axial ribs to the respective skins;

FIG. 9 is a partial cross-sectional view of the intermediate case of FIG. 2, taken along line 9-9, showing an outer end boss of a load bearing strut interconnecting the outer and inner skins; and FIG. 10 is a partial top plan view of the outer ring of FIG. 9, showing welds applied around an opening defined in the outer skin to connect the outer end boss of the load bearing strut to the outer skin.

It will be noted that throughout the appended drawings, like features are identified by like reference numerals.

DETAILED DESCRIPTION

Figure 1:
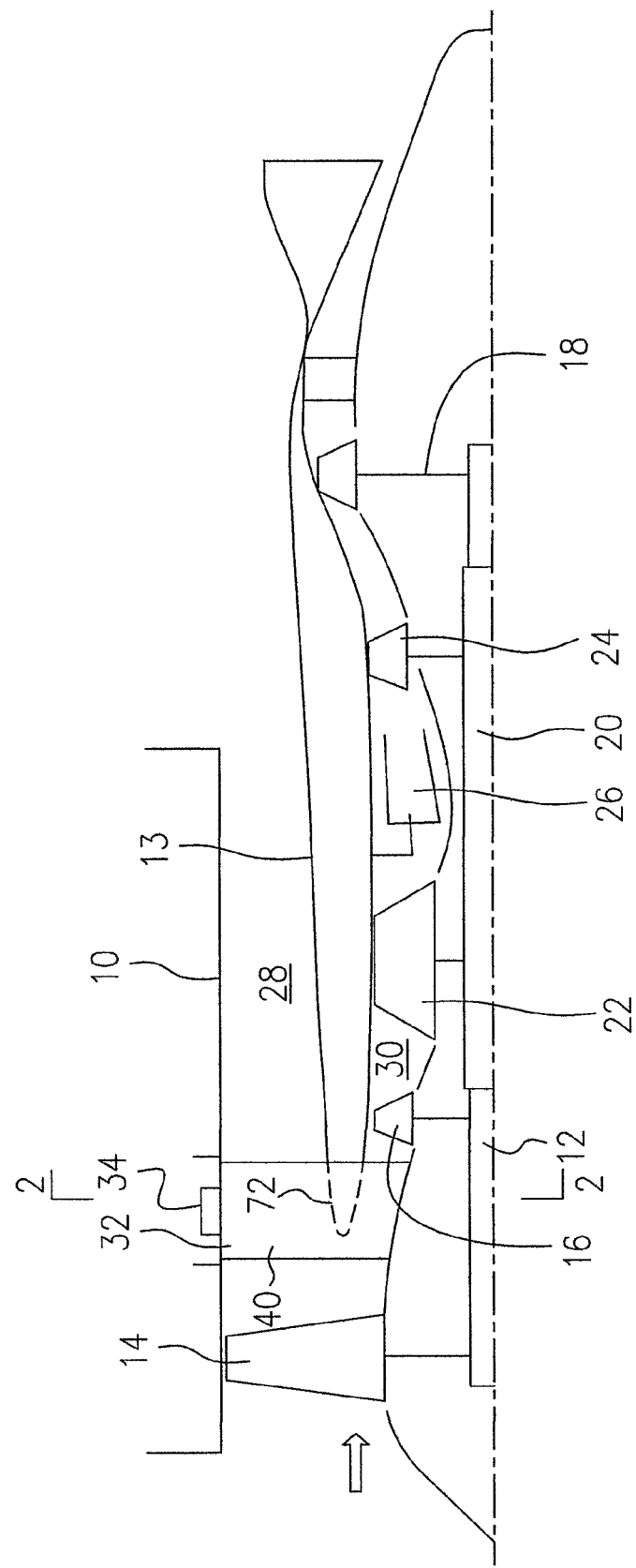
FIG. 1 is a partial schematic side cross-sectional view of a gas turbine engine.
Figure 5:
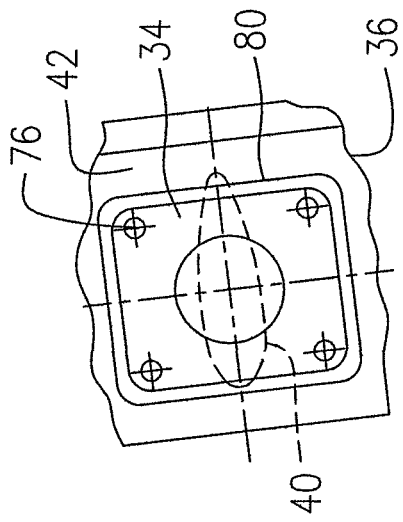
FIG. 5 is a partial top plan view of an outer ring of the intermediate case of FIG. 4, showing the mounting boss.
Figure 6:
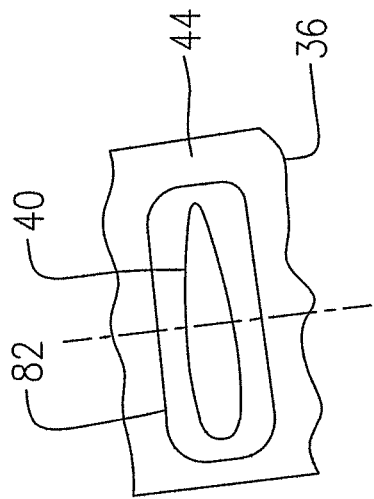
FIG. 6 is a bottom plan view of the outer ring, viewed radially and outwardly to show welds around the engine mounting boss to connect the mounting boss to the inner skin of the outer ring of the intermediate case.

FIG. 1 illustrates a turbofan gas turbine engine (not numbered) according to one embodiment. The engine includes a housing or nacelle 10, a core casing 13, a low pressure spool assembly (not numbered) which includes a fan rotor 14, a low pressure compressor assembly 16 and a low pressure turbine assembly 18 connected by a shaft 12, and a high pressure spool assembly (not numbered) which includes a high pressure compressor assembly 22 and a high pressure turbine assembly 24 connected by a turbine shaft 20. The housing or nacelle 10 surrounds the core casing 13 and in combination with the housing 10 and the core casing 13 defines an annular bypass duct 28 for directing a bypass flow. The core casing 13 surrounds the low and high pressure spool assemblies to define a core fluid path 30 therethrough. In the core fluid path 30 there is provided a combustor 26 to form a combustion gas generator assembly which generates combustion gases to power the high pressure turbine assembly 24 and the low pressure turbine assembly 18.

The terms "upstream" and "downstream" mentioned in the description below, generally refer to the airflow direction through the engine and are indicated by an arrow in FIG. 1. The terms "axial", "radial" and "circumferential" used for various components below are defined with respect to the main engine axis shown but not numbered in FIG. 1.

The above-described engine sectors are usually defined in a segmented annular case assembly including an intermediate case 32 which at its upstream end is connected to an annular fan case (not numbered) and at its downstream end is connected to a coaxially disposed bypass case (not numbered) and a compressor case (not numbered). The intermediate case 32 is usually provided with one or more mounting pads 34 for connection with the aircraft (not shown) to which the engine is mounted.

As shown in FIGS. 1, 2, 3, 4, 5 and 9, the intermediate case 32 in accordance with one embodiment, includes an outer ring 36 and an inner hub 38 defining the core fluid path 30 therebetween. A plurality of load bearing hollow struts 40 arranged in a circumferential array, extend for example from the inner hub 38 radially to the outer ring 36, thereby mounting the inner hub to the outer ring 36. The inner hub may contain a bearing assembly around for example the engine shaft 12.

In accordance with one embodiment, the outer ring 36 of the intermediate case 32 may be formed as a toroid having an outer skin 42 of sheet metal and an inner skin 44 of sheet metal. A front end and a rear end of the toroid-shaped outer ring 36 is closed by respective front and rear end components, such as annular front end ring 46 and annular rear end ring 48.

Therefore, the outer ring 36 is formed as a toroid, defined by a double skin including the annular outer skin 42 of sheet metal surrounding and radially spaced apart from the annular inner skin 44 of sheet metal. The annular front end ring 46 and the annular rear end ring 48 which form the respective front and rear ends of the outer ring 36, are also formed, in this example, of metal, such as a single forged respective component or a single butt-welded respective component. The front end ring 46 may have a cross-section in a U-shape formed with two spaced apart arms 50, 52 (see FIG. 3) fixedly joined, for example, welded or brazed to the outer and inner skins 42, 44 adjacent their front or upstream edges. The annular rear end ring 48 may also have a cross-section in a U-shape formed with two spaced apart arms 54, 56 (see FIG. 3) fixedly joined, for example, welded or brazed to the outer and inner skins 42, 44 adjacent their rear or downstream edges. An annular cavity 57 is therefore formed radially between the annular outer and inner skins 42, 44 and axially between the annular front and rear end rings 46 and 48. It should be noted that the metal annular front and rear end rings 46, 48 are more rigid/stiff than the respective outer and inner skins 42, 44 of the sheet metal to provide rigidity or stiffness to the double skin configuration of the outer ring 36. For example, an annular radial wall 58 (see FIG. 3) of the annular front end ring 46 which interconnects the radially spaced annular arms 50 and 52, is thicker than the outer and inner skins 42, 44. The annular arms 50 and 52 may also be thicker than the respective outer and inner skins 42, 44. Similarly, an annular radial wall 60 (see FIG. 3) which interconnects the spaced annular arms 54 and 56 of the annular rear end ring 48, is thicker than either one of the outer and inner skins 42, 44. The arms 54 and 56 may also be thicker than the respective outer and inner skins 42, 44.

The annular radial wall 58 of the annular front end ring 46 may be configured to function as a flange for connection with the fan case (not numbered) disposed immediately upstream of the intermediate case 32, or a dedicated flange may be provided instead, as in the case of the rear end ring described further below. When configured also as a flange, the annular radial wall 58 of the annular front end ring 46 may typically be provided with a plurality of circumferentially spaced apart mounting holes 62 for receiving fasteners (indicated by broken line 64) to connect the intermediate case 32 to the fan case flange (90 in FIG. 4).

Figure 4:
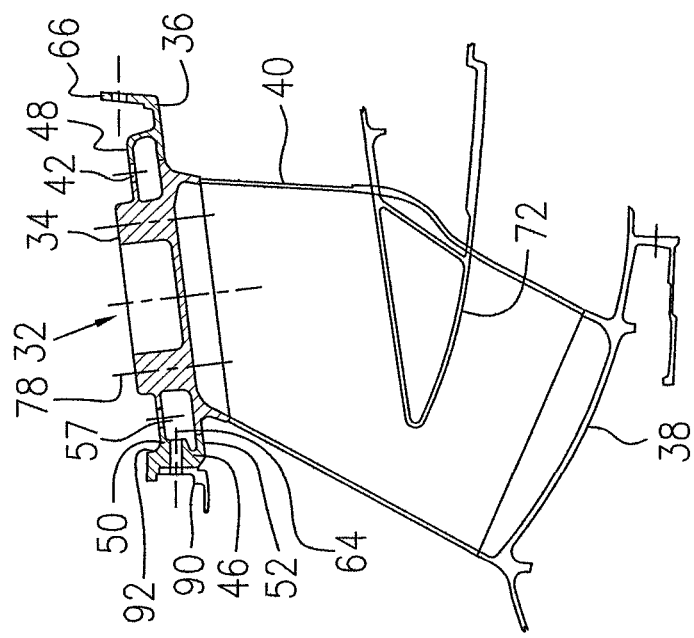
FIG. 4 is a partial cross-sectional view of the intermediate case of FIG. 2 taken along line 4-4, showing a mounting boss incorporated with a radial outer end of a load bearing strut of the intermediate case.

A plurality of circumferentially spaced mounting bosses 92 may be provided on front end ring 46 to receive threaded holes 62 to accept fasteners (indicated by broken line 64) for securing the fan case to the intermediate case, and also to reinforce the radial wall 58 as illustrated, for example in FIGS. 4 and 9.

Referring still to FIG. 3, the annular rear end ring 48 in this example is provided with a dedicated annular connection flange 66 disposed downstream of and axially spaced apart from the annular radial wall 60 of rear end ring 48. The flange 66 may typically be provided with a plurality of circumferentially spaced apart mounting holes 68 for receiving respective fasteners indicated by broken line 70, for connection to the bypass duct case disposed immediately downstream of the outer ring 36. Alternately, as described above with respect to the front end ring, the flange 66 and rear end ring 46 may be integrated into a single structure, as shown in FIG. 3*a*. Flexibility in design is thus available to the designer.

Various other suitable configurations and mounting arrangements for the front and rear end rings will be apparent to the skilled reader in light of the present description.

A splitter 72 (see FIGS. 1 and 4) may extend circumferentially between adjacent struts 40 and may be connected to the core casing 13, for directing the airflow driven by the fan rotor 14, into the respective annular bypass duct 28 and the core fluid path 30.

Each of the struts 40 is connected at a radial outer end to the outer ring 36. The radial outer end of each hollow strut 40 may include an end boss 74 which may be provided in any suitable manner, such as a cast or forged metal component, and configured for mounting (by welding in this example) the radial outer end of the hollow strut 40 to the outer ring 36 (see FIG. 9, and further description below). The end boss 74 may be integrally connected, for example by welding or brazing, to both outer and inner skins 42, 44 of the outer ring 36 and hence also functions as an axially-extending stiffening rib to reinforce the rigidity of the double skin configuration of the outer ring 36.

In accordance with one embodiment illustrated in FIGS. 2, 4, 5 and 6, at least one of the end bosses 74 may additionally be configured as the mounting pad 34 for mounting the engine to an aircraft when the intermediate case 32 is assembled in the engine (see FIG. 4). The mounting pad 34 may have any suitable configuration. In this example, the mounting pad 34 has a substantially square configuration in a top view thereof (see FIG. 5) which is relatively larger than a cross-section of the hollow struts 40 integrated with the mounting pad 34, in order to provide a relatively large mounting surface for connection to a mounting structure of the aircraft. According to an embodiment as shown in FIG. 2, there may be two mounting pads 34 provided in the intermediate case 32. Each mounting pad 34 may be provided with a plurality of mounting holes 76 (see FIG. 5) for receiving mounting fasteners, indicated by broken lines 78 (see FIG. 4) to mount the engine to the aircraft. The end boss 74 having mounting pad 34 may be welded or brazed to the body of the hollow strut 40 and may be received in respective openings 80, 82 (see FIGS. 5 and 6) defined in the respective outer and inner skins 42, 44. Welds may be applied along the entire peripheral edge of the respective openings 80 and 82 to weld the end boss 74 to both outer and inner skins 42, 44. End bosses 74 without mounting pads 34 are secured in a similar manner. For example, FIG. 10 shows the top of the outer end boss 74 which may be welded to the entire peripheral edge of an opening 84 defined in the outer skin 42 of the outer ring 36.

In contrast to end bosses 74 which do not have a mounting pad 34, end bosses 74 which have a mounting pad 34 are relatively larger in size and may project radially outwardly from the outer skin 42 to provide a secure attachment point for the aircraft, thereby avoiding any interference or unwanted contact with other components of the engine, as is well understood in the art.

The relative thicknesses of the inner and outer skins 42, 44 may be selected as necessary by the designer. For example, the outer skin 42 may be thicker than the inner skin 44 in order to react a larger portion of engine mount reaction through the outer skin.

Optionally, a plurality of circumferentially spaced generally axially-extending stiffening ribs 94 may be provided to the double skin configuration, extending between and interconnecting the outer and inner skins 42, 44 in order to increase the rigidity and structural integrity of the outer ring 36. In the examples depicted, one rib 94 is provided between adjacent end bosses 74. In another example not depicted, a plurality of ribs 94 are provided between adjacent end bosses 74. In another example not depicted, end bosses 74 do not connect inner and outer skin 42, 44, but rather a rib 94 may be provided in alignment with the end bosses 74.

In accordance with one embodiment illustrated in FIGS. 2, 7 and 8, each of the axial ribs may be formed with a portion 42*a* of the outer skin 42, formed in any suitable manner such as by plastically deforming the outer skin radially and inwardly, to be connected to the inner skin 44. The radially and inwardly extending portion 42*a* may have an axial length greater than the circumferential width thereof to define an axially elongate opening 80 in the outer skin. The entire peripheral edge of the axially elongated opening 80 is in contact with the inner skin and securely affixed thereto, for example by a weld applied along the entire peripheral edge of the axially elongated opening 80.

In accordance with another aspect, the rib 94 comprises a radially inwardly extending portion 42*a* which is provided as a local depression in the outer skin, with a central floor area in direct contact with the inner skin 44 and securely affixed thereto, such as by spot welds, by a plurality of fasteners such as rivets 85 as shown in FIG. 7*b*, or any other suitable means.

In accordance with another aspect, as shown in FIGS. 2*a*, 7*a* and 8*a*, one or more of the axial ribs 94 may be a plate 87 axially-extending within the annular cavity 57 defined within the double skin configuration of the outer ring 36, and interconnecting the outer and inner skins 42 and 44. A mating slot 86 may be provided, in one example, defined in the respective outer and inner skins 42, 44 (only one slot 86 defined in the outer skin 42 is shown in FIG. 8*a*), which receives the respective radial outer and radial inner side edges 88*a*, 88*b* of the plate 87 in order to allow application of a weld along the respective slots 86 to affix the radial outer and radial inner side edges 88*a*, 88*b* to the respective outer and inner skins 42, 44. Other suitable rib 94 configurations and attachment means will be apparent to those skilled in the art, in light of this description.

The embodiments of the described subject matter provide a structural configuration and a method of manufacturing a fabricated mounting ring incorporated with an intermediate case for a gas turbine engine.

The above description is meant to be exemplary only, and one skilled in the art will recognize that changes may be made to the embodiments described without departing from the scope of the described subject matter. Although described with respect to an intermediate case of a turbofan engine, other engine types and case types may be suitable. Modifications which fall within the scope of the described subject matter will be apparent to those skilled in the art, in light of a review of this disclosure, and such modifications are intended to fall within the appended claims.

The invention claimed is:

1. A casing for an aircraft engine, comprising:
    an outer ring and an inner hub defining an airflow passage therebetween, the outer ring having an axis defining an axial direction;
    a plurality of struts arranged in a circumferential array and extending radially from the inner hub to the outer ring to mount the inner hub to the outer ring; wherein the outer ring is defined by a double skin including an axially-extending annular outer skin of sheet metal concentrically surrounding and radially-spaced from an annular inner skin of sheet metal, the outer and inner skins generally parallel to one another, an annular front end ring and an annular rear end ring welded or brazed to the outer and inner skins adjacent respective front and rear edges of the skins to define an annular cavity between them, and the outer ring further comprising a plurality of circumferentially spaced axially-extending ribs interconnecting the outer and inner skins to reinforce the double skins; and wherein each of the struts has a radial outer end mounted to an end boss connected to the outer ring, the end boss rigidly interconnecting the outer and inner skins.

2. The casing as defined in claim 1 wherein the bosses provide at least some of said axially-extending ribs.

3. The casing as defined in claim 2 wherein the ribs comprise at least two rib types, a first rib type provided by said end bosses and a second rib type disposed between adjacent end bosses.

4. The casing as defined in claim 1 wherein at least some of the axial ribs are radially inwardly depressions of the outer skin which are connected to the inner skin.

5. The casing as defined in claim 3 wherein the second rib type is a radially inwardly depression of the outer skin which is connected to the inner skin.

6. The casing as defined in claim 1 at least some of the axial ribs are an axially-extending plate positioned within the annular cavity and affixed to the respective outer and inner skins.

7. The casing as defined in claim 3 wherein the second rib type is an axially-extending plate positioned within the annular cavity and affixed to the respective outer and inner skins.

8. The casing as defined in claim 1 wherein the respective front and rear end rings comprise an annular wall having a thickness greater than a thickness of the respective outer and inner skins.

9. The casing as defined in claim 1 wherein the front and rear end rings each have U-shape cross-section with spaced apart arms extending axially welded or brazed to the inner and outer skins.

10. The casing as defined in claim 1 wherein each of the front and rear end rings is formed as a single butt-welded component.

11. The casing as defined in claim 2 wherein at least one of the end bosses projects radially outwardly from the outer skin to form a mounting pad to mount the engine to an aircraft.

12. The casing as defined in claim 1 wherein at least one of the front and rear end rings of the outer ring is configured for connection of the casing to an adjacent casing of the engine.

13. The casing as defined in claim 1 wherein at least one of the front and rear end rings of the outer ring has spaced therefrom an dedicated annular radially-extending flange for connection with an adjacent casing of the engine.

14. The casing as defined in claim 4 wherein each of the depressions defines an opening and comprises a welding fillet applied along an edge of the opening to weld a portion of the outer skin to the inner skin.

15. The casing as defined in claim 4 wherein the depressions each are affixed to the inner skin by at least one rivet.

16. The casing as defined in claim 4 wherein the depressions each have an axial length greater than a circumferential width.

17. An aircraft turbofan bypass engine having an intermediate casing disposed between a fan casing and a co-axially-disposed by-pass duct case and a compressor case, the intermediate casing comprising:

an outer ring and an inner hub defining an airflow passage therebetween;

a plurality of load bearing hollow struts arranged in a circumferential array and extending at least from the inner hub, radially to the outer ring, thereby mounting the inner hub to the outer ring; and wherein the outer ring is formed as a toroid having an outer skin of sheet metal and an inner skin of sheet metal, a front end and a rear end of the toroid-shaped outer ring being closed by respective front and rear end components having a radial wall, the radial wall of the respective front and rear end components being thicker than each of the inner and outer skins, each of the hollow struts including a radial outer end formed with an end boss for mounting the outer end of the hollow strut to the outer ring, the end boss interconnecting the outer and inner skins, a plurality of circumferentially spaced axial ribs interconnecting the outer and inner skins to reinforce the toroid shaped outer ring, and the front and rear end components forming flanges with mounting holes for receiving fasteners to connect the fan casing and the by-pass duct case, respectively.

18. The aircraft turbofan bypass engine as defined in claim 17 wherein some of the ribs are radially inwardly depressions of the outer skin which are connected to the inner skin.

19. A method of making a mounting ring of a gas turbine engine, the mounting ring having at least one mounting boss to mount the engine to an aircraft when the mounting ring is installed in the engine, the method comprising:

providing an outer ring formed substantially in a double skin configuration having an outer skin of sheet metal surrounding and radially spaced apart from an inner skin of sheet metal;

interconnecting a respective front edge of the outer and inner skins with an annular front end ring;

interconnecting a respective rear edge of the outer and inner skins with an annular rear end ring;

using said at least one mounting boss and a plurality of end bosses of respective load bearing struts to interconnect the outer and inner skins, the load bearing struts being hollow, disposed in a circumferential array and extending radially to mount the outer ring to an inner ring disposed within the outer ring; said at least one mounting boss being formed at an outer radial end of one of the load bearing struts; and interconnecting the outer and inner skins by radially positioning a plurality of circumferentially spaced axial ribs between the outer and inner skins to reinforce the double skin configuration of the outer ring.

20. The method as defined in claim 19 comprising a step of forming each of the axial ribs by radially and inwardly deforming a local portion of the outer skin to be connected to the inner skin.

* * * * *